Sept. 12, 1961 R. E. WILLIAMS 3,000,006

MIXED-BASE DATA TRANSMISSION

Filed March 20, 1957 6 Sheets-Sheet 1

INVENTOR
Richard E. Williams

BY

Hyman Hurwitz
ATTORNEY

INVENTOR
Richard E. Williams

BY

Hyman Hurwitz
ATTORNEY

Sept. 12, 1961 R. E. WILLIAMS 3,000,006

MIXED-BASE DATA TRANSMISSION

Filed March 20, 1957 6 Sheets-Sheet 3

INVENTOR
Richard E. Williams

BY

Hyman Hurwitz
ATTORNEY

MIXED-BASE DATA TRANSMISSION

Filed March 20, 1957

INVENTOR
Richard E. Williams

BY
Hyman Hurvitz
ATTORNEY

INVENTOR
Richard E. Williams

BY

Hyman Hurwitz
ATTORNEY

MIXED-BASE DATA TRANSMISSION

Filed March 20, 1957

INVENTOR
Richard E. Williams

BY

Hyman Hurwitz
ATTORNEY

United States Patent Office 3,000,006

Patented Sept. 12, 1961

3,000,006

MIXED-BASE DATA TRANSMISSION

Richard E. Williams, Fairfax, Va., assignor to Melpar, Inc., Alexandria, Va., a corporation of New York Filed Mar. 20, 1957, Ser. No. 647,424
31 Claims. (Cl. 340—347)

The present invention relates generally to systems for converting amplitudes into coded representations of the amplitudes, and to systems for reconverting the coded representations into said amplitudes, wherein the coded representations may be constituted of a single frequency generated or detected with any desired accuracy by reference to a mixed base filter arrangement.

It has long been recognized that an analogue representation of a quantity, such as angular shaft position, voltage amplitude, or the like, may be converted to frequency of a signal wave, the latter transmitted to a remote point, and there employed to reconstitute the analogue representation. For example, a voltage may be employed to frequency modulate a carrier, by means of a reactance tube modulated oscillator or a voltage tunable oscillator, and the modulated carrier may be detected by means of a frequency discriminator to reconstitute the voltage. Typical of such techniques are those employed in F.M. broadcasting. While the latter systems are satisfactory for the broadcast transmission and reception of voice or music, the accuracy of conversion from frequency to amplitude or from amplitude to frequency by means of known techniques is not adequate to solve many telemetering or data transmission problems. It is usually considered that the best accuracies attainable in such conversions is of the order of one percent. For telemetering and data transmission accuracies of the order of a fraction of one percent may be required.

To resolve the difficulty above set out, resort has been had to binary coding systems. Such systems are unduly complex, in respect to both coding and decoding devices, and involve the transmission of a large number of pulses to convey information concerning one quantity at any one time.

In accordance with the present invention a single frequency is representative of a single magnitude, and vice versa, and it is a primary feature of the invention that the conversion process from frequency to amplitude, or vice versa, may be carried out with any desired accuracy, and by means of relatively simple circuitry.

The invention concerns itself with a novel filter arrangement, which is accurately adjustable to provide a unique response to any frequency in a relatively wide frequency band. The filter arrangement referred to may be described as a mixed base filter arrangement, for reasons which will appear as the description proceeds, and is composed of groups of individual filters, each group capable of responding to a signal occurring anywhere in a wide frequency band, despite the fact that the group is composed of a small number of narrow band filters, by the fact that a signal anywhere in the wide frequency band is simultaneously converted to sets of multiple frequencies, the frequencies of each set being equally spaced over the entire band. Each group of narrow band filters includes a response point to some one of the sets within one only of its filters, and the identification of the filters which respond, one from each group, is sufficient uniquely to identify the original signal.

In accordance with one embodiment of the invention, wherein the angular position of a shaft is to be converted into a transmitted frequency, the shaft is caused to drive commutators which select one filter from each group of filters of a mixed base arrangement, in accordance with the angular position of the shaft. In effect, then, the shaft is employed to adjust the mixed base filter arrangement to accept a frequency which is representative of shaft position. A control signal is generated at the output of the arrangement when that particular frequency is received by the mixed base filter arrangement.

A voltage tunable transmitter is provided, which is tuned continuously over a band of frequencies, preferably proceeding always in one direction, in response to a sweep voltage. The latter is locked at its last value when the control signal occurs, and the frequency transmitted is thus representative of shaft position.

At a receiver the transmitted frequency is detected or decoded by causing a mixed base filter arrangement to sense the frequencies of the transmission band in sequence in response to rotation of a shaft, until the transmitted frequency is detected, and then to stop. If the sequencing is carried out by a switching arrangement and if a drive is provided for the switches which duplicates that at the transmitter, the drives at transmitter and receiver will at all times assume identical positions.

In accordance with a further modification of the present invention, continuously varying signals, such as voltages, currents or the like, are converted to frequencies. The amplitude of a voltage, considered for example only, is converted to a pulse duration. The latter is converted to a pulse array containing spaced pulses of number proportional to the pulse duration. The pulses are then employed to step tune a mixed base filter arrangement, one step for each pulse, until the pulses have been exhausted. A tunable transmitter is then tuned to the frequency of the mixed base filter arrangement in the same manner as described hereinabove in connection with measurement of shaft position.

At a receiver a mixed base filter arrangement is step tuned from a zero position, until the transmitted signal is received and the total of the number of steps required to attain correspondence with the transmitted frequency is integrated or counted, to reproduce the original voltage.

It is, accordingly, a broad object of the present invention to provide a system of amplitude to frequency conversion, and of frequency to amplitude conversion, which provides any desired degree of accuracy in the conversions.

It is another object of the present invention to provide a system of signal amplitude to frequency conversion in which a mixed base filter arrangement is tuned, in response to the original signal amplitude, to a unique predetermined frequency representative of the amplitude, and thereafter a transmitted frequency adjusted to the response point of the mixed base filter arrangement.

Another object of the present invention resides in the provision of a system for converting a signal amplitude to a frequency by converting the signal amplitude to a pulse duration, and the pulse duration to a pulse count, utilizing the pulses to step tune a mixed base filter arrangement step by step, until the pulses are exhausted, and thereafter generating a single frequency which is accepted by the mixed base filter arrangement and which is therefore representative uniquely of the signal amplitude.

It is a further object of the present invention to provide a system for converting a frequency into a pulse count by means of a stepping mixed base filter arrangement.

It is still another object of the present invention to provide a system for converting a frequency into a shaft position, by means of a mixed base filter device having provision for effecting a direct comparison between the shaft position and the frequency and to indicate coincidence therebetween.

It is a further object of the present invention to provide a filter which is tunable in steps over a wide range of frequencies and which includes a number of filter elements small in relation to the number of frequency steps.

A further object of the invention resides in the provision of a novel frequency modulating system.

Still another object of the invention resides in the provision of a frequency modulation system, the output of which is variable in discrete steps of precisely equal spacing.

It is another object of the invention to provide a system for detecting frequency modulated waves.

A further object of the invention resides in the provision of a system for detecting frequency modulated waves on a quantized basis.

Still another object of the invention resides in the provision of a system for converting shaft rotation into frequency and for reconverting frequency into shaft position.

Another object of the invention resides in the provision of a system for effecting substantially synchronous motion of two shafts in response to transmission of a single signal on a single circuit.

Still another object of the invention resides in the provision of a system for synchronizing the motion of two shafts by converting the motion of one of the shafts into frequency of a signal, and controlling the motion of the other shaft in accordance with the frequency of the signal.

It is a further object of the invention to provide a system of frequency modulation in which amplitude of the signal is converted to pulse duration, and in which pulse duration is converted into a pulse count, and the pulse count thereafter converted into a frequency.

It is another object of the invention to convert signal amplitude into frequency of the signal, by a series of steps including conversion of the signal amplitude into pulse duration, conversion of pulse duration into pulse count, conversion of pulse count into tuning of a reference filter, and generation of a frequency which corresponds to the tuned frequency of the filter.

A further object of the invention resides in the provision of a system for detecting a frequency modulated wave, in which a filter is step tuned until it finds the frequency which is to be detected, and in which the number of steps required to tune the filter to that frequency is counted and integrated to form an output signal.

The above and still further features, objects and advantages of the present invention will become apparent upon consideration of the following detailed disclosure of specific embodiments thereof, especially when taken in conjunction with the accompanying drawings, wherein.

Figure 5:
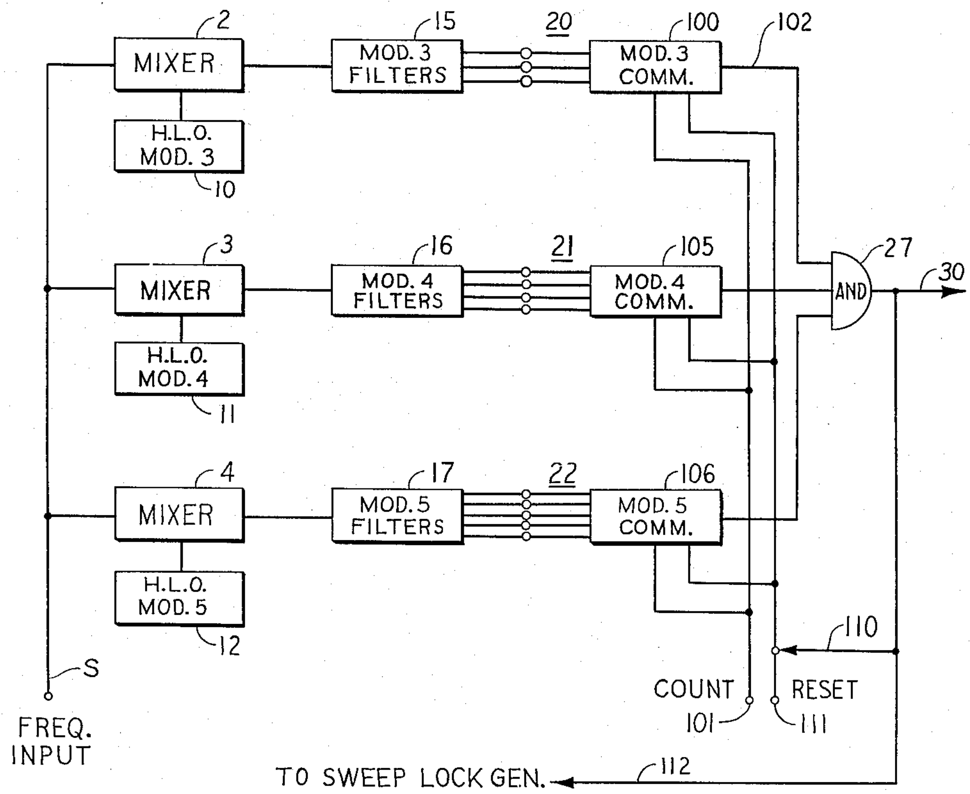
FIGURE 5 is a block diagram of a step tunable filter, which is electronically stepped to any desired acceptance frequency.
Figure 6:
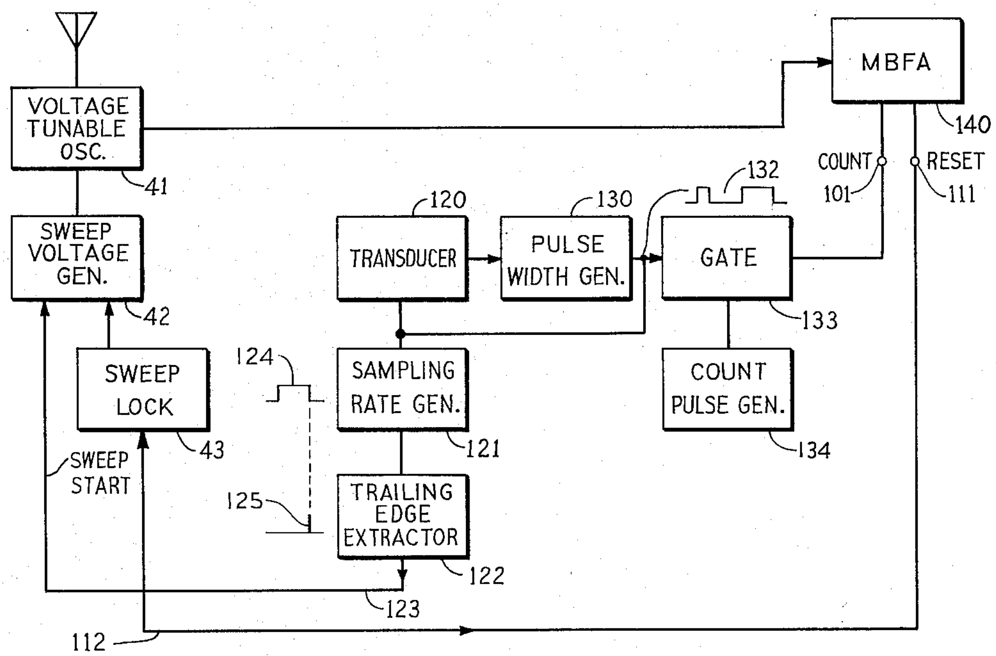

FIGURE 6 is a frequency modulator employing the step tunable filter of FIGURE 5, in which a signal amplitude is converted to a pulse duration, the pulse duration is converted to a pulse count, and the pulse count is utilized to step the step tunable filter to a position corresponding with the count, an oscillator being thereafter tuned through a range of values until it provides a response in the filter, at which tuning is stopped.

Figure 7:
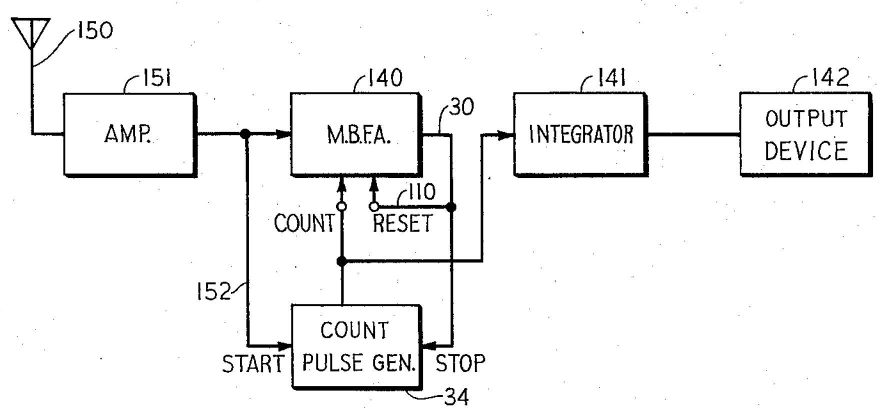

FIGURE 7 is an electronic frequency demodulator which operates by step tuning a filter from zero position to the frequency of a received wave and counts the number of steps required to obtain frequency coincidence with the received wave.

Figure 8:
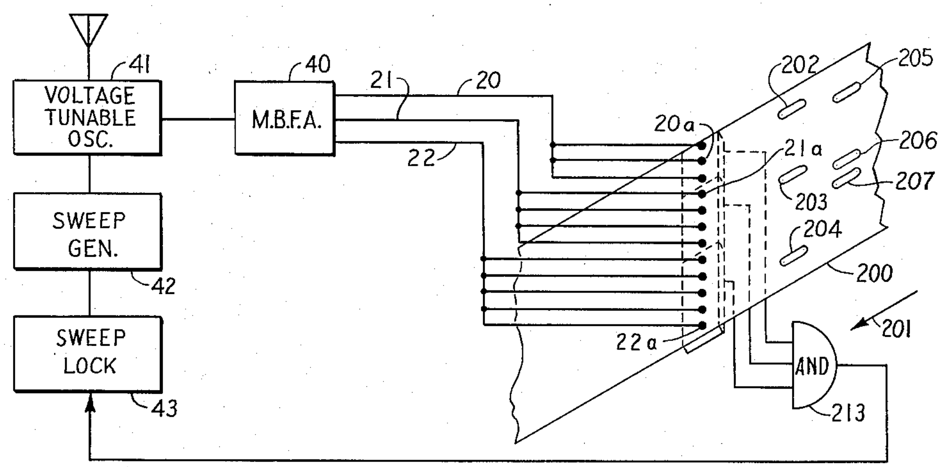

FIGURE 8 is a block diagram of a frequency coded transmitter.

Figure 9:
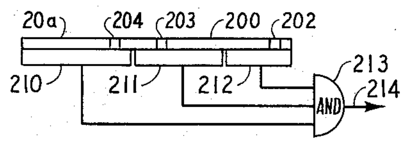

FIGURE 9 illustrates in elevation a stylus, platen and perforated control strip, of the types employable in the system of FIGURE 8.

Figure 10:
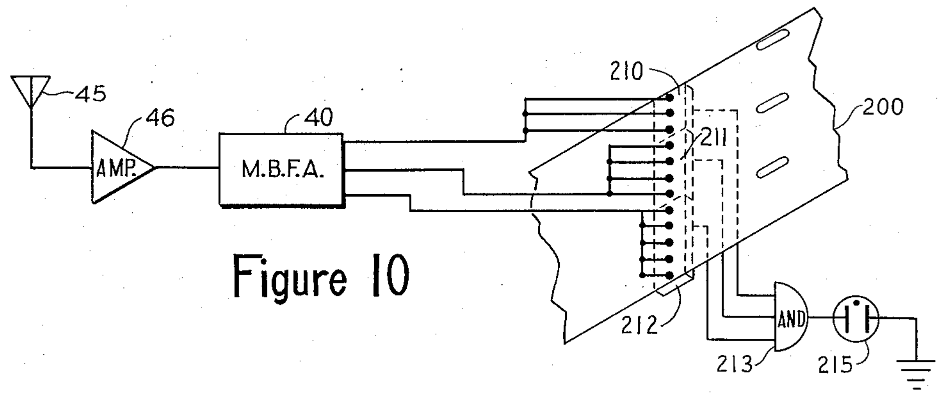

FIGURE 10 is a block diagram of a receiver for use with the transmitter of FIGURE 8.

Figure 11:
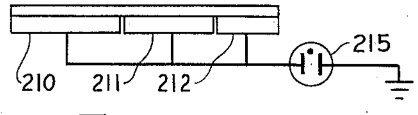

FIGURE 11 is a view in elevation of coincidence indicator, employed in the system of FIGURE 10.

In connection with the following brief description of a mixed-base filter arrangement, it is assumed, for example only, that its application involves a frequency bandwidth of 60 mc. and an accuracy of one part in sixty.

The mixed-base filter arrangement operates as follows. A signal occurring anywhere in the assumed band of frequencies is mixed in a broad band mixer with a series of harmonically related local oscillator frequencies. Each signal thus becomes a source of multiple sideband signals by virtue of mixing with the several local oscillator frequencies, and the sideband signals are spaced from each other by increments of frequency equal to the separation between the local oscillator frequencies. For example, local oscillator frequencies may be selected equal to 1, 2, 3, 4 . . . 30 mc., and these may all be of equal amplitude. In such case any incoming signal will generate plural sidebands spaced 1 mc. apart and extending throughout bands 30 mc. to each side of the incoming signal. A narrow band filter having a bandwidth, for example, of slightly greater than 1 mc. and a center frequency near the center of the assumed 1000 mc. wide band, will, therefore, respond to the incoming signal regardless of its location in the band, since one of the generated sidebands must fall within the passband of the filter. However, inadequate information will be provided relative to the frequency of the incoming signal, since there is no information provided concerning which of the available local oscillator frequencies effected generation of the accepted sideband.

The simple system above described may be extended in order to enable measurement and identification of the frequency of a signal. More specifically, a first plurality of filters is provided which may together cover a band of frequencies equal in width to the frequency separation of the local oscillator signals, each filter covering a portion of the band and the several filters being in non-overlapping relation. For example, if the local oscillator signals are spaced by 3 mc., 3 filters may be employed, each covering a band of 1 mc. A further plurality of filters, say 4, may be employed in conjunction with a local oscillator spacing of 4 mc., each filter having an acceptance band of 1 mc. The system may obviously be further extended, if desired, in that still a further plurality of filters may be employed, say 5, in conjunction with a local oscillator spacing of 5 mc., each filter again having an acceptance band of 1 mc. and so on. There are employed, then, three distinct filter arrays, each employing a gamut of local oscillator frequencies differently spaced, each array including a different number of filters, and each array extending over the local oscillator spacing associated with the array. All the filters may be identical in respect to acceptance bandwidth, and the filters of the several arrays may have center frequencies separated from one another by some integral multiple of 1 mc., including zero.

Any signal incoming to the system will be received by one of the receivers of each array, and one only, assuming perfect filtering. It is then possible to show, employing congruence algebra, that a total of $3\times4\times5=60$ unique combinations of filter output will be available, for the specific example hereinabove provided. By observing which filter in each array passes a signal it is possible to determine the absolute value of the signal with a resolution of 1 mc. Accordingly, instantaneous observation and measurement of a frequency within a band 60 mc. wide with a resolution of 1 mc. may be accomplished by means of a total of 3+4+5=12 filters, and the code formed by noting which filters provide output is unique in the observed band.

The philosophy of the present system can be described and clarified through the use of certain relationships which are basic to the algebra of congruences. One such relationship, expressed symbolically as $a \equiv b \pmod{m}$, (read $a$ is congruent to $b$ modulo $m$) means that $a$ and $b$ leave the same remainder upon division by $m$, or that $a$ and $b$ differ, if at all, by a multiple of $m$. In the example provided, where 1 mc. wide filters are employed for a sideband separation of 3 mc., the modulo is said to be 3/1=3. For a 4 mc. separation, employing 4 mc. cells, the modulo is 4. The original signal and the frequency displaced signals are said to be congruent, modulo the number of cells in the interval between adjacent sidebands, since the specific cell within which the signal is received provides the remainder, and this remainder is the same for all signals separated by frequency intervals equal to the frequency separation between sidebands.

If a plurality of filter arrays is employed, the filters being identical but the number of filters per array differing (a change in modulo), a single signal will give rise to output in one and only one filter of each array; and the combination of energized filters may be uniquely indicative on one frequency if the moduli are properly selected.

It may be shown that if the moduli are relatively prime in pairs; that is, no two have a common factor other than unity, unique solutions will be available equal to the product of the moduli. The number of filters required in a system using several relatively prime moduli is equal to the sum of the moduli, whereas the attainable frequency resolution is equal to the product of the moduli. The number of frequency cells which can be resolved by a given number of filters takes a maximum value when the difference between the greatest and least of the moduli is minimized.

If ambiguities of frequency measurements are to be maintained trivial; i.e., if a measurement error must be not greater than an indication in an adjacent frequency "cell" of five mc., a modification of the basic system can yield the required characteristics. The modification consists of making each filter bandwidth $n$ times the basic cellular bandwidth, where $n$ is the number of moduli of the system—3 in the example. Thus, the receivers may be made 3 mc. wide in the proposed example. Additionally, the three arrays are mutually offset from one another by the basic cell width of 1 mc. The offset may be achieved by individual filter tuning or by conventional heterodyne processes. If an incoming signal were swept in frequency over the entire band under examination, only a single adjacent cellular transfer would take place at a time yielding only trivial ambiguities.

Referring now more particularly to the accompanying drawings, the reference numeral 1 denotes a signal input terminal to which may be applied a signal of frequency. For the sake of example, only, the frequency may be assumed to subsist in a band 60 mc. wide. The signal is applied from terminal 1 to a plurality of mixers 2, 3, 4, suitable for the frequency band involved. To each of the respective mixers is supplied a plurality of harmonically related frequencies from harmonic generators 10, 11, 12, respectively. The outputs of the mixers 2, 3, 4 are supplied respectively to filter arrays 15, 16, 17, each array including a plurality of filters connected in parallel. The array 15 includes three filters of bandwidth $f$=1 mc. and lying adjacent to one another in frequency so that the array covers a band 3 mc. wide. The harmonic generator 10 is described as providing frequencies having values which are congruent modulo $3f$, which implies in mathematical language that any of the frequencies, if divided by $3f$; i.e., 3, leaves the same remainder. The harmonic generators 11 and 12 provide frequencies which are congruent modulo $4f$ and $5f$ respectively. In general if $f$ is the bandwidth of a single filter, assumed a constant for all filters of the system, and if $n$ be the number of receivers in a given array, the harmonic frequencies employed for generating a response in one of the receivers of the array are always congruent modulo $nf$. Accordingly, in the specified example, the harmonic generator 10 provides frequencies separated by 3 mc.; the harmonic generator 11 provides frequencies separated by 4 mc.; and the harmonic generator 12 provides frequencies separated by 5 mc.

It will be clear if each series of harmonics extends over a band of at least 30 mc. in the assumed example, the separate series commencing at values 3, 4, and 5, respectively, that any signal received within the specified band 60 mc. will produce a response in each of the filter arrays, assuming the latter to be centered on the band. As the band of harmonic frequencies extends beyond 30 mc., the center frequencies of the arrays may, obviously, depart corresponding from the center of the band of interest.

Any viewed signal, moreover, will generate a response in one, and only one, of the receivers of each array, assuming perfect filters; i.e., filters having vertical skirts.

It can be shown that the combination of filters in which response is generated, one from each array, is indicative without ambiguity of the value of one received frequency. It follows that if numeral indicators be applied to the several read-out leads from the filter arrays, the first array carrying the numerals 1, 2, 3; the second the numerals 1, 2, 3, 4; and the third the numerals 1, 2, 3, 4, 5; and if these numeral indicators are activated by a signal of any given frequency, that the three numeral code number or word indicated, one numeral from each array, represents the frequency of reception, albeit not in decimal notation.

It is desirable, in order that each different code number which may possibly be generated shall represent a unique frequency, that the several moduli employed be relatively prime in pairs, or more generally that the numbers of receivers per array be congruent modulo $n, m \ldots$ respectively; the values of $n, m \ldots$ being relatively prime in pairs. The number of filters required is equal to the sum of the moduli, and the bandwidth covered is equal to the product of the moduli times the bandwidth per filter. The number of filter bandwidths, frequency increments or cells, which can be resolved by means of a given number of filters, assumes a maximum value when the difference between the greatest and smallest moduli employed is minimized.

Figure 1:
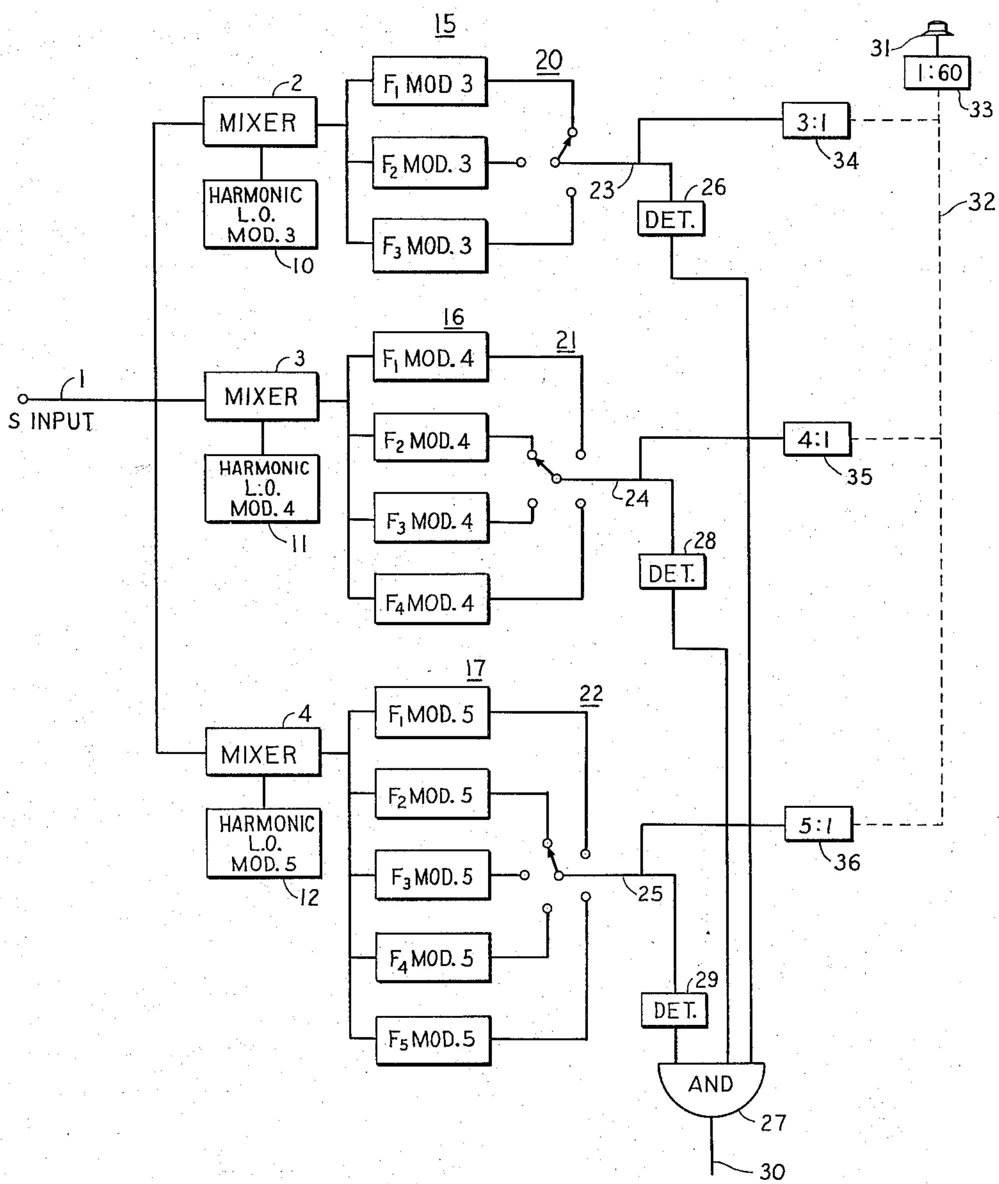
FIGURE 1 is a block diagram of a step tunable filter arranged in accordance with the invention.

Referring more particularly to the specific system and the specific values described in conjunction with FIGURE 1 of the accompanying drawings, the moduli employed are 3, 4, and 5, and the receiver bandwidth $f$ is 1 mc. The numerals 3, 4, and 5 are relatively prime in pairs. It follows that a total of 3+4+5=12 filters covers a band of 3×4×5=60 mc. The responses of the filter arrays; i.e., the code representative of that filter in each array which accepts a given signal, uniquely indicates or represents that frequency.

The choice of moduli for any particular application is determined on consideration of probable equipment complexity to obtain desired resolution, sensitivity, and the like. The use of tri-modulo systems appear optimum for resolutions of one part in a few hundreds; whereas, for resolutions of one part in a few thousands quad-modulo systems generally will prove more efficient; i.e., the system will require four arrays of filters.

Generation of the required harmonic frequencies of uniform amplitude may be accomplished in several ways, which are not novel per se, and which are therefore not illustrated nor described in detail. For example, millimicrosecond pulses may be generated having a pulse repetition rate equal to the basic sideband interval. In the alternative, multiple oscillators may be employed which are locked to one another in harmonic relation and which are per se rich in harmonics.

The filter arrays 15, 16, 17 are exemplified by three arrays of cells, these being identifiable as #1, #2, and #3. The cells of the several arrays are subscript numbered in order and represent the several filters of the arrays 15, 16, 17.

Figure 2:
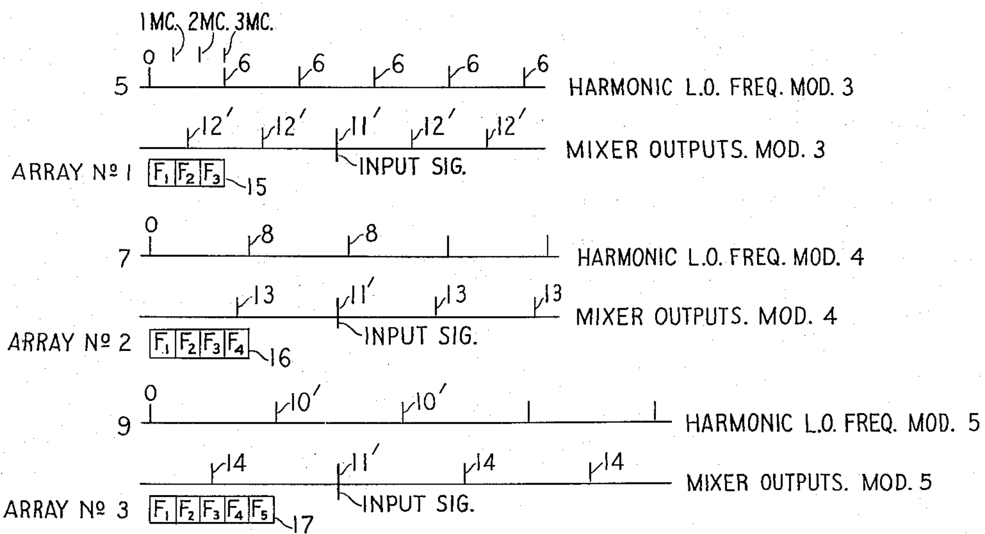
FIGURE 2 is a frequency diagram utilized in explaining the operation of the step tunable filter of FIGURE 1.

The process of coding any frequency in a wide frequency band in accordance with the present invention may be exemplified as follows. Assume that the cells employed are precisely 1 mc. wide and that cell arrays of 3, 4, and 5 cells are employed and superposed in frequency as indicated in FIGURE 2; i.e., with the first cell of each array precisely superposed on the first cell of the others and the succeeding arrays following in close order.

In such case it may be assumed that there is a frequency for which cells #1 respond in the several arrays. As the assumed frequency increases in steps of 1 mc., it will progressively fall within all the #2 cells, all the #3 cells, advancing one cell place for each 1 mc. increase until cells #3 have been reached.

One further 1 mc. advance in frequency, then, returns the responses to cell #1 of array #1; but in arrays #2 and #3 the responses proceed to cells #4, respectively. On one further 1 mc. advance in frequency the responses will occur in cells #2, #1, and #5 of the respective arrays. By continuing the process it will be apparent that each advance of frequency equal exactly to 1 mc. will cause a relative cell displacement in adjacent cell arrays equal to one cell. The arrays #1 and #2 are therefore capable of coding $3\times4=12$ frequencies without redundance, after which the cycle recommences. Array #3, however, provides five code positions for each 12 code positions provided by arrays #1 and #2 in combination, so that $3\times5=60$ mc. steps may be taken without redundance.

Certain ambiguities may appear in the system as described by reason, primarily, of the fact that it is difficult to construct receivers which are tuned to precisely adjacent frequencies and which do not overlap; i.e., which have perfectly sharp skirt selectivity. The possibility of ambiguity may be completely removed by making each receiver somewhat narrower in passband than the value required to cover a band segment completely; i.e., gaps are left between the receivers of each array.

The systems hereinbefore described briefly and in general terms all are susceptible to ambiguity, especially in that a variation in frequency which is adequate to cause transfer of response from one cell to an adjacent cell generally effects a code change in all three places of the three-letter code representative of any frequency. For example, if a frequency F*a* gives rise to coded responses in cells 345, a shift should generate a response in cells 111, if the shift takes place across the boundaries of the cells. In fact, if one numeral fails to change this indicates a gross ambiguity in the final total indication. It is desirable for some purposes that continuous frequency-coverage system be provided in which small variations in frequency, or frequencies which may generate responses in adjacent cells, shall generate code changes in one significant figure only. This may be accomplished in a tri-modulo system by a modification of the systems which utilizes triple width cells but displace adjacent arrays of cells by 1/3 cell width. In general, in *n*-modulo systems the widths of all cells may be increased by a factor of *n*, and the displacement may be $1/n$ of a cell width.

Referring now particularly to FIGURE 1 of the accompanying drawings, the reference numeral 1 denotes a signal input terminal, the signal consisting of a frequency variable over a predetermined frequency band. For the sake of providing concrete illustration of the invention, as required by the pertinent statutes relating to Letters Patent, it is assumed that the input frequency extends over a 60 megacycle band and that the system of FIGURE 1 is intended to measure the frequency of the signal on a quantized basis to one part in 60. Extensions of the system to other frequency bands, to other frequency quanta, and to other members of quantized steps, will become apparent as the description proceeds, and the specified example is not intended to be restrictive of the invention.

The signal provided at input 1 is applied in parallel to three mixers, denoted by the reference numerals 2, 3, and 4 respectively. To the mixer 2 is applied signal from a harmonic local oscillator 10, to the mixer 3 is applied signal from the harmonic local oscillator 11 and to the mixer 4 is applied signal from a harmonic local oscillator 12. Harmonic local oscillator 10 is stated to be modulo 3. The significance of this statement is that the spacing of the local oscillator frequencies generated by the harmonic local oscillator 10 are spaced by three megacycles; i.e., three times the basic incremental frequency employed in the system. On a similar basis the local oscillators 11 and 12 are respectively modulo 4 and modulo 5. The first frequency generated by the local oscillator 3 may then be three megacycles, the first frequency generated by the local oscillator 11 may be four megacycles and the first frequency generated by the local oscillator 5 may be five megacycles. The total number of harmonics generated by each oscillator may be sufficient to cover the band, 60 megacycles wide, which is subject to analysis. The signal input at terminal 1 constitutes then a carrier, and the harmonic local oscillators generate sidebands for that carrier, it being intended that the sideband frequencies shall be spaced in accordance with the modulus stated for the harmonic local oscillator, and extending over a band at least equal to the band under analysis; i.e., 60 megacycles in the specific example provided herein. The output of the mixer 2 is then a series of frequencies three megacycles apart, extending over a band 60 megacycles wide, and each of the frequencies being congruent modulo 3 to some base frequency. Similar statements may be made with respect to the outputs of the mixers 3 and 4, the moduli being, however, different.

Referring now again more specifically to FIGURE 2 of the accompanying drawings, there is shown at line 5 a number of local oscillator frequencies, plotted on the horizontal axis and separated by spacings of three megacycles and, accordingly, these local oscillator frequencies are local oscillator frequencies modulo 3. At line 7 is shown a series of local oscillator frequencies 8 which have separations of four megacycles and, accordingly, represent frequencies modulo 4. At line 9 are shown local oscillator frequencies 10', which are separated by five megacycles and, accordingly, are in the present embodiment of the invention, modulo 5. Frequencies are assumed to be available over the entire band of frequencies subject to analysis over a band of frequencies as wide as the band of frequencies subject to analysis in each case, but are not so illustrated, to simplify the drawings. At 11' is shown an input carrier deriving from terminal 1 and the sidebands associated therewith by virtue of mixing of the local oscillator frequencies 6 therewith in the mixer 2. The carrier frequency corresponding with input signal, is illustrated at 11' and the sideband frequencies, separated from a carrier frequency 11' by increments of three megacycles, are illustrated at 12. The same input signal 11', when applied to the mixer 3, and combined with local oscillator frequencies 8 which are modulo 4, appear at the output of the mixer as frequencies 13', separated from the carrier frequency 11' by increments of four megacycles. The same carrier frequency 11' when combined in the mixer 4, with local oscillator frequencies 10', generate sidebands 14, separated from the carrier 11' and from each other by increments of five megacycles.

It will be realized that regardless of the frequency position of the carrier or input signal 11', the sideband frequencies associated therewith at the output of any one of the mixers will always be spaced from that carrier frequency by some multiple of the oscillator frequency employed. For example, the frequencies 12' will always be spaced from the carrier 11' respectively by 3, 6, 9, 12 . . . megacycles, and as the carrier frequency varies the sideband frequencies will vary therewith and remain locked with respect thereto. Similarly, the modulo 4 sidebands and the modulo 5 sidebands will remain locked with respect to the carrier 11', with spacings appropriate to the modulus.

At the output of the mixer 2 is provided a plurality of filters 15, connected in parallel, and occupying adjacent frequency bands. Each of the filters accepts a frequency band of one megacycle so that the three frequency bands together occupy a three megacycle band, which corresponds precisely to the spacing between sidebands 6. Similarly, at the output of the mixer 3 is provided an array of four filters 16, each one megacycle wide, and together occupying a spectrum of four megacycles; i.e., the same spacing as exists between the sidebands 8. At the output of the mixer 4 is provided an array of five filters 17, each filter having a passband of one megacycle, the passbands lying adjacent to, and the array of filters occupying a band of five megacycles; i.e., a band equal to the spacing between adjacent sidebands 10'.

The arrays 15, 16, and 17 are illustrated in FIGURE 2 of the accompanying drawings in relation to the sideband frequencies and to the carrier frequency involved. For the sake of simplification, it is assumed that all the F–1 filters are identical, that all the F–2 filters are identical, etc., and exist in superposed relation with respect to the band of frequencies involved. It will be noted then that one of the sidebands 12', falls within the passband of the array 13 and that one of the sidebands 13 falls within the array 16 and that one of the sidebands 14 falls within the passband of the array 17. This will be true regardless of the position of the carrier frequency 11, since the sidebands are spaced from the carrier frequency modulo 3, 4, and 5. It will be noted, however, that because the spacing between the sidebands is not the same for the different moduli, the sideband which is coincident with any array may fall into a different filter in each of the arrays. The combination of filters which respond to the sidebands 12, 13, and 14 represents uniquely the frequency of the carrier signal 11. For the value of the carrier frequency 11 illustrated in FIGURE 2, the code is 2—4—3 since the sideband 12' passes through the filter F–2 modulo 3, through the filter F–4 modulo 4 and through the filter F–3 modulo 5. Should the carrier frequency 11' increase by a factor of one megacycle, the code will be converted to 3—1—4. Each shift of one megacycle results in a shift of one place in the filter arrays, and the responses are cyclic within each array, since when one of the sidebands 12' passes out of the range of the array 15 another sideband 12' will be available to take its place. For a continually increasing carrier, each numeral of the code representative of the carrier frequency increases one unit for each unit of increase of the carrier until the units in the modulus have been exhausted, when the cycle repeats, from which can be shown that the total number of combinations available is equal to the product of the moduli employed, without redundance; i.e., each combination is unique, and each combination corresponds with one and only one carrier frequency.

There has, accordingly, been provided a filter arrangement of a stepped tuned type, in which a small number of filter elements may be employed to measure the frequency of a signal which may have a large number of possible discrete values. If it can be assured that the carrier frequency is variable in discrete steps, as distinguished from being continuously variable, it will be clear that the passbands of the separate filters F–1, F–2, F–3, F–4, and F–5 may be narrowed and need not be one megacycle wide in that gaps may subsist between the separate filters. In fact the filters may be narrowed to a degree compatible with the accuracy of the possible settings of the carrier 11'. This feature, as will become apparent as the description proceeds, contributes to the accuracy of the system in its functions of modulating and demodulating signals and also prevents ambiguities.

At the outputs of each of the filters of the arrays 15, 16, and 17 is provided a terminal, one for each filter. The filters associated with the array 15 are denoted by the reference numeral 20, those associated with array 16 by the numeral 21, and those associated with the filters 17 by the reference numeral 22. Accordingly, there are three terminals 20, four terminals 21 and five terminals 22. A movable switch arm is provided for selecting the several terminals 20, a further movable switch arm 24 for selecting the several terminals 21 and still a further movable switch arm 25 for selecting the movable terminals 22. The switch arms 23, 24, and 25 are driven in synchronism from terminal to terminal of the array 20, 21, and 22, respectively.

Switch arm 23 is connected by a detector 26 to an AND gate 27. The switch arm 24 is similarly connected to an AND gate 27 by a detector 28 and the switch arm 25 by a detector 29. Accordingly, there is an output signal derivable from the output lead 30 of the AND gate 27 only when a signal is simultaneously accepted by those of the filter arrays 15, 16, and 17 which are connected respectively to the switch arms 23, 24, and 25. The switch arms 23, 24, and 25 may, accordingly, be moved to any desired positions with respect to the output terminals 20, 21, and 22, and the positions selected then correspond with a tuning for the over-all system, considered as a filter. Because the filter arrangement of FIGURE 1 employs a plurality of arrays of filters which are congruent modulo different numbers, the arrangement is called hereinafter a mixed base filter arrangement corresponding with the moduli. In order to provide successive step tuning of the mixed base filter arrangement of FIGURE 1 resort may be had to a mechanical arrangement. More specifically, a turnable knob 31 is provided, which drives a shaft 32 through a 1 to 60 step-up gearing 33. The shaft 32 drives the switch arm 23 via a three to one reduction gearing 34, the movable switch arm 24 via a four to one reduction gearing 35 and the movable switch arm 25 via a five to one reduction gearing 36. This assures that for each 6° of rotation of the knob 31, the switch arms 23, 24, and 25 will each be stepped one position; i.e., from one to an adjoining one of the terminals 20, 21, and 22, and the switch arrangement may be cyclic so that successive 6° rotations of the knob 31 will cause connection of the AND gate 27 in effect to the filters F–1, F–2, F–3, F–1, F–2, F–3 . . . and so on ad infinitum. There has, accordingly, been provided, and illustrated in FIGURE 1 of the accompanying drawings, a novel tunable filter, which is tunable in steps, in response to rotation of a knob 31. It will be realized, of course, that for the knob 31 may be substituted any desired drive device such as a motor, and that the knob 31 may, if desired, be responsive to a measuring device in accordance with techniques well known per se in the telemetering art.

Figure 3:
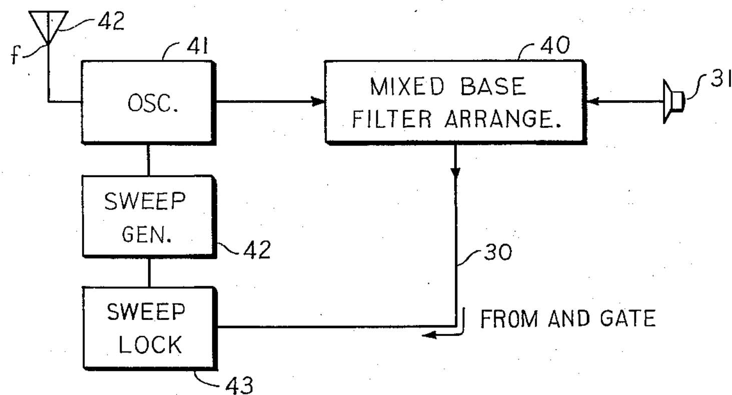
FIGURE 3 is a block diagram of a frequency modulation system, in which shaft position is converted to frequency of an oscillator by step tuning a mixed base filter arrangement to have an acceptance frequency corresponding with shaft position, and thereafter tuning an oscillator to the frequency of the filter.

Referring now more particularly to FIGURE 3 of the drawings, there is illustrated a system for converting shaft position into frequency of an oscillator. Signal generated by the oscillator at the specified frequency may be transmitted to a remote point, at which the frequency may be reconverted into a shaft position. In accordance with the invention the position of the shaft is represented a knob 31. It has heretofore been explained that in conjunction with the functional block diagram of FIGURE 1, that rotation of knob 31 produces a shaft of one megacycle in the acceptance band of a mixed base filter arrangement, denominated 40 in FIGURE 3, for each six degrees of rotation of knob 31. It has further been indicated that by different choice of moduli in the system, any desired degree of accuracy may be attained, and in fact that instead of a tri-modulo system, a quad-modulo system may be employed, or a greater number of moduli may be employed, if desired. So long as the moduli are relatively prime in pairs the total number of frequency increments over which the mixed base filter arrangement 40 may be tuned will be equal to the product of the number of moduli, and, accordingly, any desired accuracy may be built into the system of FIGURE 3, which is in no sense restricted to the specific accuracy recited herein for the sake of example. An oscillator 41 is provided, which is of the voltage tunable type, such as a carcinotron, a klystron, or alike. A sweep voltage generator 42 supplies voltage to the oscillator 41, causing same to tune over a desired range repetitively. For example, the sweep generator 42 may be of the diode phantastron type and may generate essentially a linear sawtooth wave for application of the oscillator 41. In such case the oscillator 41 will tune over a range corresponding with the range of voltage applied, and then return to a starting point, and will recommence sweeping. It will be realized, however, that the precise wave shape generated by the sweep generator 42 is not of the essence of the invention, and in fact that if desired sweeping may be accomplished in response to a triangular wave, line wave, or the like. A sweep lock signal generator 43 is provided, which is connected to the diode phantastron sweep generator 42, and locks the latter in the voltage value which it may have at the instant of application of the sweep lock voltage. Sweep lock device 43 is controlled in response to signal on lead 30 deriving from AND gate 27 of the system of FIGURE 1.

Accordingly, when the mixed base filter arrangement 40 is tuned by means of the knob 31 to a given frequency, corresponding with a desired or predetermined position of the knob 31, the sweep generator 42 sweeps the frequency of the oscillator 41 through its range of values, until such time as the frequency generated corresponds with the acceptance frequency of the mixed base filter arrangement 40. At that time signal output is derived by lead 30, which actuates the sweep lock 43 to terminate the sweep, maintaining the oscillator at its then frequency. This frequency corresponds precisely to the position of the knob 31. The frequency generated by the oscillator 41 may be transmitted to a remote location by means of a radiating element 42, if desired, or via a land line, or by means of any other desired communication link.

Figure 4:
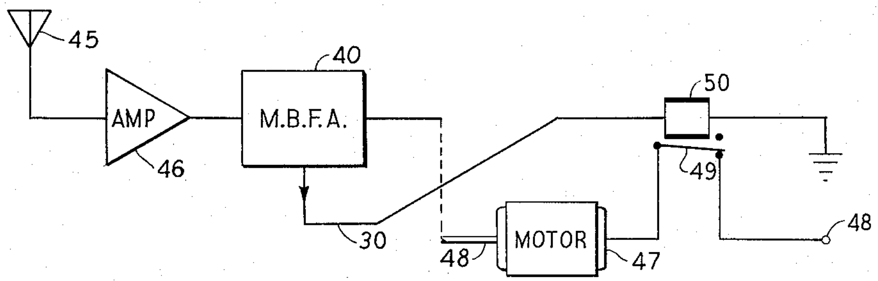
FIGURE 4 is a frequency demodulator, for converting a frequency into a shaft position, by step tuning a filter in synchronism with rotation of the shaft until the filter accepts the frequency.

In FIGURE 4 of the accompanying drawings is illustrated in block form a system for converting the frequency generated by the oscillator 41 of FIGURE 3 into position of a shaft, whereby the position of the latter shaft may at all times correspond with the position of the knob 31 of FIGURE 3. In the system of FIGURE 4 is provided an intercept device 45, such as an antenna if the control signal has been radiated, and an amplifier or receiver 46 coupled thereto. The output of the amplifier or receiver 46 is applied to a mixed base filter arrangement 40, duplicating the mixed base filter arrangement 40 of FIGURE 1. The tuning of the latter is continually varied by means of an electric motor 47 which is energized from a voltage supply terminal 48. In series between the motor 47 and the supply terminal 48 is provided a normally closed switch 49 which may be opened in response to energization of a relay coil 50. The latter is supplied with energy deriving from the output lead 30 of the mixed base filter arrangement 40. In operation, accordingly, the tuned frequency of the mixed base filter arrangement 40 is continually varied in steps as the motor 47 rotates, until a signal is accepted by the mixed base filter arrangement 40. At that time a signal is transmitted over lead 30 to the relay coil 50, which opens the switch 49, and terminates rotation of the motor 47. The then position of the motor shaft 48 corresponds with the position of the knob 31. Any modification or change of position of the knob 31 results in relative detuning between the mixed base filter arrangements at the transmitter and receiver of the system. The transmitter than acts to re-tune the oscillator 41, the relay coil 50 becomes de-energized, and the switch 49 again closes causing continued rotation of the motor 47 until the receiver filter again finds the transmitted frequency.

Referring now to FIGURE 5 of the accompanying drawings, there is illustrated a wholly electronic mixed base filter arrangement which is the electronic analog of the mechanically tuned mixed base filter arrangement of FIGURE 1. The several systems are identical in concept and operation, to the points in the circuits represented by the output terminals 20, 21, and 22 of the modular filters. In the system of FIGURE 5, an electronic commutator or ring counter 100 is connected to the terminals 20. Count or stepping pulses are applied to the commutator 100 from a count terminal 101, causing transfer of signals from successive ones of the leads 20 in succession, to an output lead 102, with which proceeds to AND gate 27. Similarly, a count of four ring counter or commutator 105 is connected to the terminals 21, and a count of five ring counter or commutator 106 to the terminals 22. In general the number of input positions in each commutator must equal the number of output terminals from the associated modular filter, and as count pulses are applied from the count terminal 101 the several commutators step in synchronism to select in a cyclic manner the several output leads of the several filters. Since all the commutators are stepped from signals supplied from a single count terminal 101, the commutators operate in synchronism, to effect simultaneously a transfer from one to an adjacent one of the terminals 20, 21, and 22 respectively. When, by this process of stepwise selection, the several modular filters 15, 16, and 17 simultaneously supply signal to the AND gate 27, an output signal is applied on output lead 30. It will be appreciated that detectors may be supplied in series with the output leads from the commutators, in order that the AND gate 27 may be supplied with D.-C. pulse signals. In the alternative detectors may be included in each input lead to each of the commutators 100, 105, and 106, in order that the commutators may operate on D.-C. pulses. In the latter case obviously D.-C. pulses will be supplied also to the AND gate 27.

When a signal is available at output lead 30, this signal is applied to a reset lead 110, which serves to reset the several commutators 100, 105, and 106 to their zero positions, and also provides a reset pulse at a terminal 111, and a sweep lock pulse on the lead 112.

A distinction in operation between the systems of FIGURE 1 and FIGURE 5 will now be realized, which is additional to that represented by the fact that one is mechanical and one is electrical, in that in the system of FIGURE 5 the switching arrangement may be reset to zero by means of a reset pulse, and is automatically reset to zero when the system provides an output signal on lead 30. In the system of FIGURE 1 no reset provisions are made. The system illustrated in FIGURE 5 of the accompanying drawings represents an instrumentality having certain novel features and characteristics. In the first place it represents a filter which may be step tuned in response to pulses applied to the terminal 101 to any one of a large number of discrete or quantized positions, starting from some zero position, which may be established by applying a pulse to the reset terminal 111. Secondly, if an input signal of a frequency acceptable to the system is applied to the input terminal S, and if count pulses are applied to the terminal 101, the system will continually step its acceptance frequency, until it passes the input signal. At this point a reset pulse will automatically be supplied from the output terminal 30, and the operation will repeat. Accordingly, the system constitutes an arrangement for converting frequency to pulse count, on a continual basis.

The electronic mixed base filter arrangement of FIG-

URE 5 finds application in the modulation system of FIGURE 6. In that figure is provided a voltage tunable oscillator 41, a sweep voltage generator 42, and a sweep lock 43, which operate as do the corresponding elements of FIGURE 3, and which are not further described for that reason. The sweep voltage generator 42 includes a sweep start signal input circuit (being normally quiescent) which serves to initiate each voltage sweep, the sweep voltage generator 42 being quiescent in the absence of the sweep start signal; i.e., being operated in the synchronous mode instead of in the free running mode. A transducer 120 is provided which may be a microphone, a strain gage, or any other known device for translating a measured quantity into a voltage having an amplitude representative of the quantity. The output of the transducer is then an analog voltage which may be continuously varying in the course of time. To the transducer 120 is applied signal from a sampling generator 121, which serves to sample the output of the transducer 120 at regular intervals, in accordance with techniques which are well known in the field of multiplex communication. The trailing edge of the sampling pulses are abstracted by a trailing edge abstractor 122, which normally takes the form of a differentiating circuit having a device for deriving a response appropriate to the trailing edge of a square pulse as distinguished from the leading edge. Accordingly, on the output lead 123 of the trailing edge abstractor 122 is provided a pulse, at the end of each sampling pulse, so that if the sampling pulses are represented at 124 the trailing edge pulses will be simulated at 125. The trailing edge pulse operates to start the weep of the sweep voltage generator 42.

The output of the transducer 120, which consists of the sampled pulses, is applied to a pulse width modulator 130, the output of which then corresponds with one pulse per sampled value of the transducer output, that pulse having a length corresponding with the amplitude of the sampled pulse. The pulse length modulated signal 132 is applied as a gating voltage to a gate 133, to which is applied a counting pulse sequence from a counting pulse generator 134. The counting pulses are equally spaced short pulses having such spacing and duration that sixty such pulses may be generated during one of pulses 132 when the latter has its maximum length, and obviously fewer pulses if the pulse duration 132 is reduced. The gate 133 passes the counting pulses to an electronic mixed base frequency arrangement 140, as count pulses; i.e., to the input terminal 101. The mixed base filter arrangement 140 then steps its acceptance frequency by increments, while the pulses subsist, and at the termination of the pulses will have attained some predetermined frequency value representative of the pulse count. The count terminates at the end of each pulse width. At a slightly later time, the trailing edge abstractor 122 forms a pulse 125, and starts a sweep of sweep voltage generator 42, and corresponding frequency scan of tunable oscillator 41. The scan continues until the frequency generated by the tunable oscillator 41 is accepted by the mixed base filter arrangement 140 at which time is generated an output pulse from the latter, which is applied to the sweep lock 43, over the lead 112, stopping the sweep and retaining the frequency of the tunable oscillator 41 fixed at the then value. Simultaneously, the output pulse is fed back into the mixed base filter arrangement and resets the counters or commutators 100, 105, and 106 of the latter, as explained in connection with FIGURE 5.

The tunable oscillator now retains its last frequency position until the output of the transducer 120 has been sampled again and the system has gone through its cycle setting up a new value in the mixed base frequency arrangement if required, and setting up thereafter a further frequency tuning operation of the system.

The system of FIGURE 7 represents in the form of a block diagram an arrangement for demodulating the frequency generated by the system of FIGURE 6, and reconstituting the output of the transducer 120. In the system of FIGURE 7 is provided an antenna or other suitable intercept device 150, which is consonant with the type of transmission link utilized. The intercepted signal is applied to an amplifier or receiver 151, and thence to an electronic mixed base filter arrangement 140, which may duplicate the system of FIGURE 5 of the accompanying drawings. The latter is normally set at its minimum value. On reception of a signal deriving from the transmitter of FIGURE 7 a start signal is applied via lead 152 to the count pulse generator 34, which may if desired duplicate that utilized in the transmitter. The count pulse generator 34 causes the electronic mixed base filter arrangement 140 to increase its frequency stepwise until the mixed base frequency arrangement 140 finds the transmitted frequency applied thereto from the amplifier or receiver 151. At that point is generated an output signal on lead 30. This output signal is fed back as a reset pulse for the lead 110 to the mixed base filter arrangement 140, resetting the latter for a further operation. And it is also applied to the count pulse generator 34 to stop the latter. Accordingly, a count is generated by the count pulse generator 34 which is proportional to the frequency, or representative of the frequency, intercepted by the amplifier 151. The pulse generated by the count pulse generator 34 is applied to integrator 141, which translates the pulse count into a signal amplitude. The signal amplitude as generated by the integrator 141 is indicated on any desirable type of output device 142.

For example, if the transducer 120 of FIGURE 6 were a microphone the output device 142 might be a loud-speaker or acoustic radiator. If the transducer 120 were a strain gage, the output device 142 might be a recorder or a visual indicator for indicating the amplitude of the strain measured by the strain gage. Other combinations of complementary transducers will suggest themselves to those skilled in the pertinent art.

The systems of FIGURES 3, 4, 6, and 7, and the mixed base filter arrangements of FIGURES 3 and 5, depend upon the principle that the mixed base filter arrangement will be tuned step-wise from an initial frequency to a final frequency, and in a 3, 4, 5 modulo system the total number of steps involved may be 60. It will be clear, however, that there is available a set of three output terminals, a set of four output terminals and a set of five output terminals deriving from the mixed base filter arrangements in the specific embodiment described herein, and that the terminals of each set may be selected independently of selection of a terminal of another set, and without running through the entire gamut of frequencies, at least for certain purposes. For example, if it were desired to tune the mixed base filter arrangement of FIGURE 1 to a frequency the code of which was known, it would suffice to position the switch arms 23, 24, and 25, either manually or in any other manner, without running through the entire gamut of frequencies until the required code number were reached. Similarly, in the system of FIGURE 5, count pulses might be applied independently to the commutators 100, 105, and 106, rather than synchronously to the several commutators, in order to position these commutators to some desired code. The advantage of so doing would be that a saving of time would occur. This procedure is followed in the FIGURES 8 to 11 inclusive. In the system of FIGURE 8 a sequence of frequencies is generated, under control of indicia on a tape. For the sake of example it is assumed that the indicia take the form of holes in the tape, although other forms of indicia may be employed, and punch cards may be employed instead of tape, and other well-known expedients in the art may be employed.

Referring to FIGURE 8 of the accompanying drawings the reference numeral 200 represents a tape which is fed in the direction of an arrow 201, as by a clock, a motor or some other convenient tape drive means. On the tape is recorded in transverse arrangement a sequence of holes 202, 203, and a succeeding arrangement of holes 205, 206, and 207. Tape 200 moves over a set of three platens 210, 211, and 212, in the elevation of FIGURE 9 which are mutually insulated from one another. The output terminals 20, 21, and 22 of a mixed base filter arrangement 40 are brought to a set of styli, 20*a*, 21*a*, 22*a*, which ride on the tape 200, at positions wherein one of the styli 20*a* may intercept the hole 202, one of the styli 21*a* may intercept the hole 203 and one of the styli 22*a* may intercept a hole 204. Three possible hole positions exist then for the hole 202, four possible hole positions for the hole 203 and five possible hole positions for the hole 205. The three platens 210, 211, and 212 are associated respectively with the sets of styli 20*a*, 21*a*, and 22*a*, so that each one of the platens provides an output signal for each array of holes such as 202, 203, 204 or 205, 206, 207. The platens 210, 211, and 212 are connected by means of suitable leads to an AND gate 213, having an output lead 214, which is activated only in response to a signal deriving from the several platens simultaneously. Holes 202, 203, 204, by virtue of their lateral position on the tape 200, together represent a frequency code, which is capable of selecting a frequency corresponding to that code in a mixed base filter arrangement 40. As the tape 200 feeds through the system, successive arrays of holes are provided to the styli, and, accordingly, the code is modified in accordance with some predetermined arrangement. Each modification of the code represents a frequency setting of the mixed base filter arrangement 40.

As in the system of FIGURE 3, there is provided a voltage tunable oscillator 41, a sweep generator 42 and a sweep block 43, the latter operative to stop the sweep generator 42 at the point at which output is available in the AND gate 213. Accordingly, voltage tunable oscillator 41 scans over a range of frequencies until it reaches that frequency to which the mixed base frequency arrangement 40 is tuned, at that point the tuning of the oscillator 41 ceases, and transmission occurs at the selected frequency. As the tape 200 is fed past the sets of styli, the frequency is continually shifted, as a function of time.

In order to intercept and detect the variations of frequency, the signals transmitted from the oscillator 41 are intercepted by means of an intercept antenna 45, assuming a radiation link, the intercepted signals are amplified in an amplifier 46 and applied to a mixed base filter arrangement 40. The latter includes sets of output terminals 20, 21, and 22, corresponding with the output terminals employed in the system of FIGURE 8 and in a similar manner these output terminals constitute or are connected to appropriate styli which ride on a tape 200. The latter may be provided with aperture arrays which are identical to those provided in the transmitter tape. If then the two tapes are synchronously fed, each frequency transmitted will find the receiver mixed base filter arrangement tuned to receive that frequency. The several styli 210, 211, 212 are in the receiver system of FIGURE 10 connected to an indicator 215, which is illuminated in response to output from the AND gate 213. It follows then that the indicator 215 will be illuminated for each transmission from the transmitter of FIGURE 8. Failure of illumination indicates a lack of correspondence between the coding of the holes utilized at the transmitter and at the receiver. Obviously, a system of the type illustrated in FIGURES 8 to 11 inclusive and described herein may be employed for identification of friend or foe; i.e., for I.F.F. The transmitter and receiver codes may be changed from day to day, or as circumstances dictate, and the code transmitted for identification purposes represents then a frequency code; i.e., a time controlled shift of frequencies from one discrete value to another. At the receiver the decoder consists of a device which is controlled by the tape 200 and which includes the mixed base frequency arrangement 40, for receiving only the frequencies transmitted. Should there be a failure of correspondence between the receiver and transmitter tapes, this fact will be readily indicated. Such lack of coincidence will indicate that transmission is from a foe rather than from a friend.

In the several systems herein described it will be apparent that interchange of leads may be effected within each of the arrays 20, 21, and 22 and that such interchange of leads will represent a failure of direct correspondence between the frequency code generated and the quantity measured. On effecting corresponding lead interchanges at both receiver and transmitter, the system as a whole will not be affected by the change of leads, but it will then be impossible to decode the coded values, in terms of amplitude, shaft position or other quantity. In the case of speech, the speech represented frequency modulated signal if detected by a conventional frequency detector would be unintelligible. When detected by a mixed base receiver system utilizing the same secrecy coding as is employed at the transmitter, the speech would remain intelligible.

The sweep and lock phantastron 42, employed in the transmitter of the present system, may be of the diode-transitron type disclosed at pp. 326, 327 of Radiation Laboratory Series #16, published by McGraw-Hill Co., and entitled "Microwave Mixers." Attention is directed to FIGURES 7–23 of that volume for a suitable circuit diagram.

What I claim is:

1. In a system for converting signal amplitude to frequency, a mixed base filter arrangement comprising means for converting a given frequency to a plurality of first frequencies $f_1$ separated in pairs by an interval $N_1F$ means for converting said frequency to a further plurality of second frequencies $f_2$ separated in pairs by an interval $N_2F$, where $N_1$ and $N_2$ are integers, a plurality of $N_1$ adjacent first filters each of bandwidth F and covering together a band equal to $f_1$, said first filters responsive to one of said frequencies $f_1$ and arranged to provide a response in one only of said first filters in dependence on the value of $f_1$, $N_2$ adjacent second filters each of bandwidth F and covering together a band equal to $N_2F$, said second filters responsive to one only of said frequencies $f_2$ and arranged to provide a response in one only of said second filters in dependence on the value of $f_2$, and means for selecting one of said first filters and one of said second filters in response to said signal amplitude, whereby the combination of the selected first and second filter represents uniquely said signal amplitude.

2. The combination in accordance with claim 1 wherein said signal amplitude is angular shaft position, and wherein said means for selecting is a multiple contact switch.

3. The combination in accordance with claim 1 wherein said signal is an electrical signal, and wherein said means for selecting are electronic commutators.

4. The combination in accordance with claim 1 wherein said signal amplitude is amplitude of a mechanical movement.

5. The combination in accordance with claim 1 wherein said means for selecting includes a first multiple position commutator having a switching point for each of said first filters, a second multiple position commutator having a switching point for each of said second filters, an output circuit for each of said commutators, means for stepping the switching points of each commutator in succession, and a logical AND circuit connected to said output circuits for providing a signal in response to joint response of one of said first filters and of one of said second filters.

6. In combination a mixed base filter arrangement tunable to accept any selected frequency in a relatively wide band, a shaft, means for rotating said shaft to any selected angular position, means responsive to shaft position for tuning said filter arrangement to a frequency corresponding with said shaft position, a transmitter of oscillations, means for adjusting the frequency of said oscillations to correspond with the tuning of said mixed base filter arrangement, and means for transmitting said oscillations to a remote point wherein said mixed base filter arrangement includes a plurality of filter gamuts, each of said filters of each of said gamuts being a band-pass filter, the separate gamuts having different numbers of filters, said numbers being relatively prime in pairs.

7. In combination, a mixed base band-pass filter arrangement adjustable to accept any selected frequency in a relatively wide band, a mechanically movable device, means for moving said device over a range of positions, means responsive to the position of said device for adjusting said mixed base band-pass filter arrangement to pass a frequency corresponding with said position, a tunable source of oscillations, means for varying the frequency of said oscillations over said relatively wide frequency band, and means for terminating the variation of tuning of said oscillations in response to a predetermined response by said mixed base band-pass filter to said oscillations wherein said mixed base filter arrangement includes a plurality of filter gamuts, each of said filters of each of said gamuts being a band-pass filter, the separate gamuts having different numbers of filters, said numbers being relatively prime in pairs.

8. In combination a mixed base band-pass filter arrangement adjustable to accept uniquely any selected frequency in a relatively wide frequency band, a source of signal having amplitude, and means for adjusting said mixed base band-pass filter to accept a frequency corresponding uniquely with said amplitude, wherein said mixed base filter arrangement includes a plurality of filter gamuts, each of said filters of each of said gamuts being a band-pass filter, the separate gamuts having different numbers of filters, said numbers being relatively prime in pairs.

9. The combination in accordance with claim 8 wherein said last means comprises means for converting said amplitude to a pulse duration, and means for adjusting the frequency of said mixed base band-pass filter stepwise in a given sense over a number of steps representative of said pulse duration.

10. The combination in accordance with claim 9 wherein is provided a source of recurrent signals, wherein said means for adjusting the frequency of said mixed base band-pass filter step-wise is responsive to said recurrent signals, and wherein is provided means for supplying said recurrent signals to said means for adjusting during said pulse duration.

11. In combination, a source of signal of frequency I, means for converting said signal of frequency I to a first plurality of first frequencies $f_1$ separated in pairs by frequency intervals $N_1F$, means for converting said signal of frequency I to a further plurality of further frequencies $f_2$ separated in pairs by frequency intervals $N_2F$, where $N_1$ and $N_2$ are relatively prime integers, means for channeling only one of said frequencies $f_1$ to a selected one of $N_1$ first channels as a function of the value of frequency I, means for channeling only one of said frequencies $f_2$ to a selected one of $N_2$ second channels as a function of said value of frequency I, means for selecting any one of said first channels, and any one of said second channels, and means for signaling concurrent selection of that one of said first channels and of that one of said second channels which corresponds with a predetermined value of the frequency I.

12. The combination according to claim 11 in which said means for selecting includes a motor driven device for selecting all the possible combinations of said first and second channels in succession, means normally energizing said motor, and means for disabling said means normally energizing said motor in response to said signaling.

13. The combination according to claim 11 wherein said means for channeling includes means for selecting all the possible combinations of said first and second channels in succession.

14. The combination according to claim 11 wherein said means for channeling includes means for sequentially and repetitively selecting all said first channels in a predetermined time per channel and means for sequentially and repetitively selecting all said second channels in said predetermined time per channel.

15. In combination, a source of signal of variable frequency I, means for converting said variable frequency I to a first gamut of frequencies $f_1$ having fixed spacings in pairs of $N_1F$, where F is a frequency band, means for converting said variable frequency I to a second variable gamut of frequencies $f_2$ having fixed spacings in pairs of $N_2F$, where $N_1$ and $N_2$ are relatively prime, means for channeling only one of said first gamut of frequencies $f_1$ to a selected one of $N_1$ first channels according to the instantaneous value of I, and means for channeling only one of said second gamut of frequencies $f_2$ to a selected one of $N_2$ second channels according to said instantaneous value of I.

16. The combination according to claim 15 wherein is provided means for at will selecting one of said first channels and one of said second channels, and means for varying the value of I over a range of values including that value which corresponds with the selected channels, and means for automatically locking the frequency I on attainment of said correspondence between said frequency I and the selected channels.

17. The combination according to claim 15 wherein is provided means for selecting available different combinations of said first and second channels in sequence until that pair of channels is selected which corresponds to the value of I, and means for providing a signal representative of the number of selections made by said means for selecting.

18. In combination, a source of signal of variable frequency I, means for converting said variable frequency I to a first variable gamut of frequencies $f_1$ having fixed spacings in pairs of $N_1F$, where F is a frequency interval, means for converting said variable frequency I to a second variable gamut of frequencies $f_2$ having fixed spacings in pairs of $N_2F$, where $N_1$ and $N_2$ are relatively prime, means for channeling only one of said frequencies $f_1$ to one of $N_1$ channels according to values of I, means for channeling only one of said frequencies $f_2$ to one of $N_2$ channels according to said values of I, means for selecting a predetermined one of said $N_1$ channels concurrently with a predetermined one of said $N_2$ channels, and means for adjusting the value of I to a frequency corresponding simultaneously with the selected channels.

19. In an identification system, means for transmitting a signal of frequency I having a predetermined value in mixed base notation, and a remote receiver for said signal, said remote receiver including a mixed base filter arrangement responsive only to said signal to provide an output signal, wherein said mixed base filter arrangement includes a plurality of filter gamuts, each of said filters of each of said gamuts being a band pass filter and the separate gamuts having different numbers of filters, said numbers being relatively prime in pairs.

20. In combination, a source of signal of variable frequency, means for sweeping said frequency over a range of values, means for terminating said sweeping in response to a control signal and for maintaining the last frequency of said source while said control signal persists, and a mixed base filter arrangement for generating said control signal in response to attainment of said signal in the course of said sweep to a frequency corresponding with a pre-established acceptance frequency of said mixed base filter, wherein said mixed base filter arrangement includes a plurality of filter gamuts, each of said filters of each of said gamuts being a band-pass filter, the separate gamuts having different numbers of filters, said numbers being relatively prime in pairs.

21. In combination, a source of input signal of predetermined frequency, means for converting said input signal of predetermined frequency to a plurality of frequencies each having a value with respect to a different modulus, said moduli being relatively prime, and a gamut of filters for each modulus, each gamut of filters being responsive only to a different one of said plurality of frequencies and each consisting of a different plurality of filters.

22. In combination, a mixed base filter arrangement including a plurality of filter gamuts, all said filters being of substantially the same width and the separate gamuts having different numbers of filters, said numbers being relatively prime in pairs, a source of signal of frequency variable over a wide range of values, means responsive to said signal for generating plural frequencies variable with said frequency and falling respectively within the different filter gamuts for all values of frequency.

23. In a system for converting a signal frequency to a pulse count, a stepwise turnable mixed base filter, means for tuning the response of frequency of said mixed base filter stepwise in response to sequential pulses from an initial value of frequency response, a source of said sequential pulses, and means for terminating said pulses on attainment of coincidence of said signal frequency and the response frequency of said mixed base filter.

24. In combination, a mixed base band pass filter arrangement adjustable to respond uniquely to any selected one of a plurality of frequencies in a relatively wide band, a mixed base electronic commutator, means responsive to different settings of said mixed base electronic commutator for adjusting said mixed base band pass filter arrangement to pass different ones of said frequencies, means for actuating said commutator to successive positions in response to clock pulses, and a source of said clock pulses, wherein said mixed base filter arrangement includes a plurality of filter gamuts, each of said filters of each of said gamuts being a band-pass filter, the separate gamuts having different numbers of filters, said numbers being relatively prime in pairs.

25. In combination, a mixed base filter arrangement including a plurality of filter gamuts, the separate gamuts having different numbers of filters, said numbers being relatively prime in pairs and means for applying signal commonly to all said filters.

26. The combination according to claim 25 wherein is further provided a source of signal of frequency variable over a wide range of values, means responsive to said signal for generating plural frequency gamuts variable with said frequency, one frequency of each frequency gamut falling respectively within the different filter gamuts for all values of the first mentioned frequency.

27. In combination, a mixed base filter arrangement including a plurality of filter gamuts, said filters having pass frequencies respectively separated by a common frequency increment, the separate gamuts having different numbers of filters, said numbers being relatively prime in pairs.

28. The combination according to claim 27 wherein is further provided a source of signal of frequency variable over a wide range of values, and means responsive to said signal for effecting signal flow through each of said filter gamuts representative uniquely of said frequency.

29. The combination according to claim 28 wherein said last means is responsive to said signal for generating plural frequencies variable with said frequency and each falling within the response band of a different one of said filter gamuts for all values of said frequency.

30. The combination according to claim 29 wherein said plural frequencies are plural frequency gamuts, each gamut containing differently spaced frequencies proportional to the numbers of said filters.

31. In combination, a mixed base filter arrangement including a plurality of filter gamuts, the separate gamuts having different numbers of filters, said numbers being relatively prime in pairs, a source of signal of frequency variable over a wide range of values, means responsive to said signal for generating a plurality of frequency gamuts, means for applying separate ones of said frequency gamuts to separate ones of said filter gamuts, said filter gamuts each including plural frequencies spaced by a predetermined frequency increment, said frequency increments being directly proportional to said numbers of filters included in the associated frequency gamuts.

References Cited in the file of this patent

UNITED STATES PATENTS

| | | |
|---|---|---|
| 2,287,925 | White | June 30, 1942 |
| 2,413,263 | Suter | Dec. 24, 1946 |
| 2,530,693 | Green | Nov. 21, 1950 |
| 2,708,749 | Schmitt | May 17, 1955 |